Aug. 6, 1929.  J. J. HIGDON  1,723,856
TAMPING MACHINE
Filed Feb. 18, 1928   2 Sheets-Sheet 1

INVENTOR
J. J. Higdon,
BY
ATTORNEY

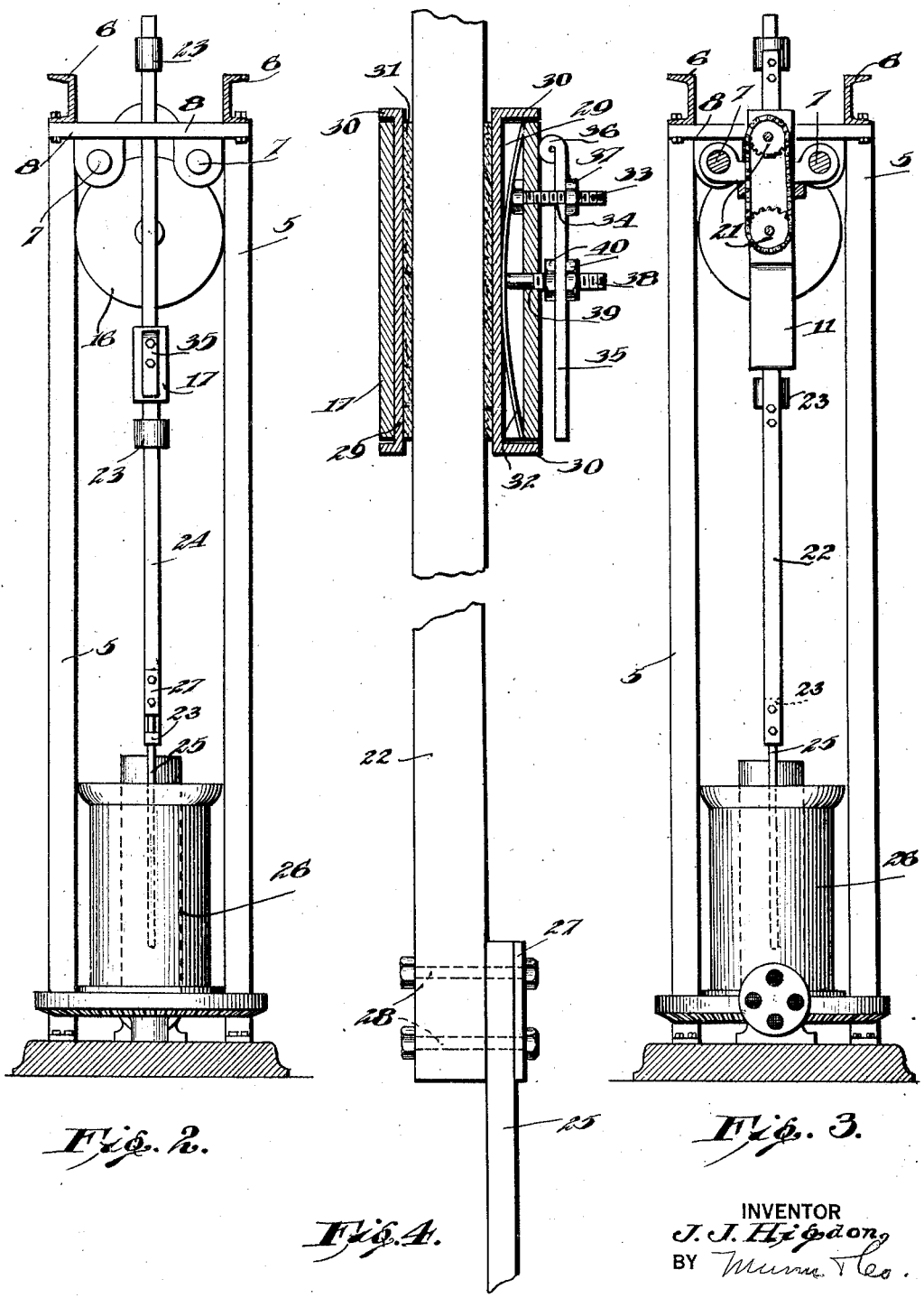

Patented Aug. 6, 1929.

1,723,856

UNITED STATES PATENT OFFICE.

JAMES J. HIGDON, OF BROOKSVILLE, FLORIDA.

TAMPING MACHINE.

Application filed February 18, 1928. Serial No. 255,330

My invention relates to plastic pipe and other tubular object tamping machines.

An object of the invention is to provide a tamping machine whereby the plastic material, from which a molded object is formed, is uniformly tamped.

Further the invention provides a tamping machine wherein the usual reciprocatory tamping stick is slidably connected with its operating mechanism so that it will reach the lowest point in the plastic material upon each down stroke, thus eliminating soft areas in the completed article.

The invention also contemplates a tamping machine which includes a carriage for supporting the tamping element whereby the latter may be advanced to an unworked area of the plastic material being tamped.

With the preceding and other objects and advantages in mind, the invention consists in the novel combination of elements, constructions and arrangement of parts to be hereinafter specifically referred to, claimed and illustrated in the accompanying drawings, wherein:

Figure 2 is a vertical sectional view taken on line 2—2 of Figure 1;

Figure 3 is a similar view taken on line 3—3 of Figure 1; and

Figure 4 is a fragmentary detail view partly in elevation and partly in cross section.

Figure 1:
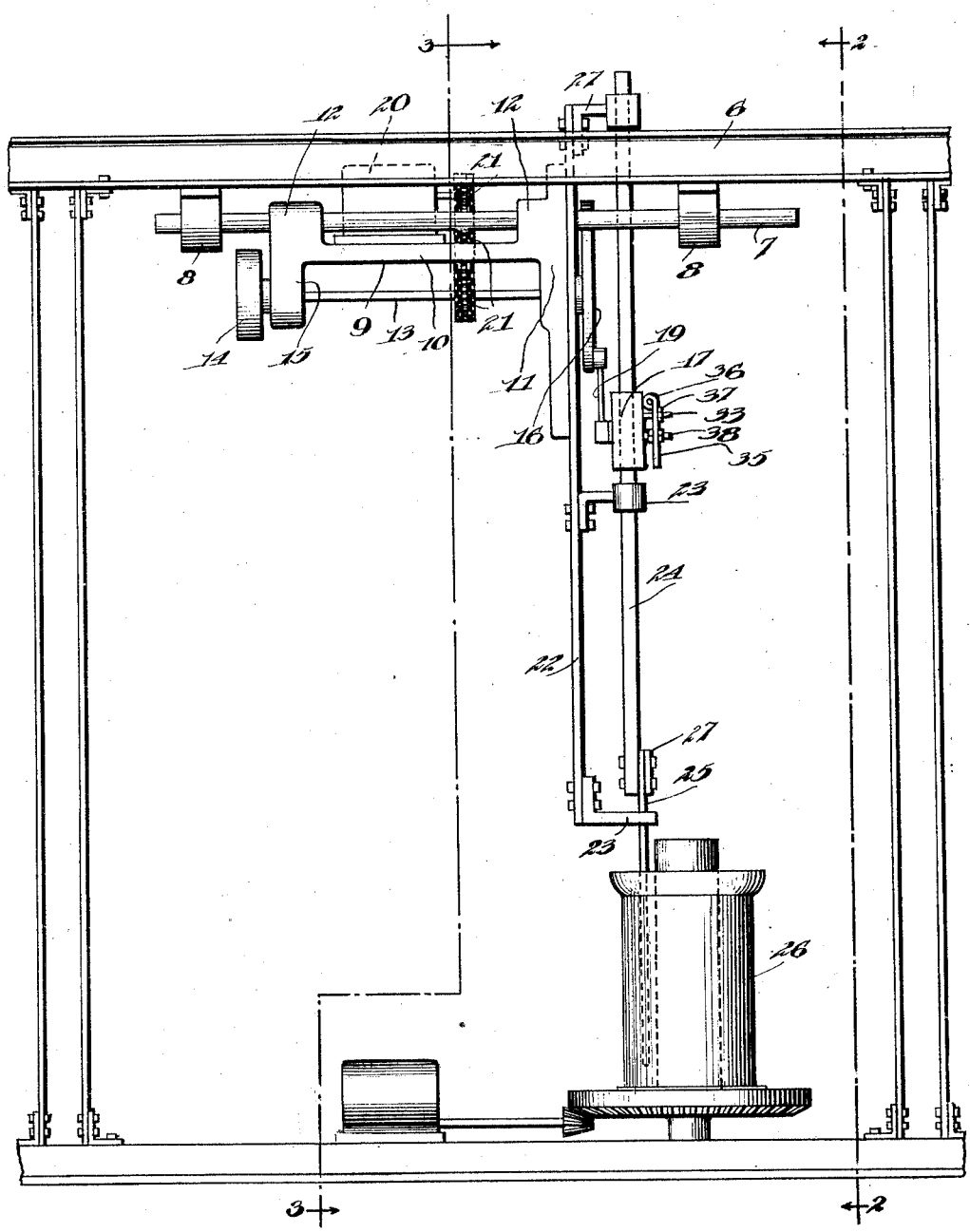
Figure 1 is a side elevation of a plastic pipe tamping machine constructed in accordance with my invention.

Referring to the invention in detail a frame or supporting structure 5, embodying connected horizontally disposed elevated channel shaped members 6, is provided. Spaced parallel horizontal guide rods 7 are supported in brackets 8 attached to and depending from the channel members 6.

A carriage or casting 9 is slidably mounted on the rods 7 and comprises a horizontal base plate 10 formed with a vertically extending plate 11 at its inner end. Longitudinally alined sleeves 12 are cast with the plates 10 and 11 and are slidably received on the rods 11. A horizontally disposed shaft 13 carrying a fly wheel 14 at one end, is journalled in the plate 11 and a bearing 15 formed with the base plate 10. A rotary disk 16 is fixed to the forward end of the shaft 13 and is operatively connected with a vertically movable reciprocable sleeve or holder 17 by means of a pitman rod 19. For the purpose of reciprocating the tamping rod holder, a motor 20 is mounted upon the base plate 10 and is geared directly to the shaft 13 by a sprocket chain 21, engaging sprocket wheels 21' carried by the shaft 13 and motor shaft, respectively.

Secured to the outer vertical face of the plate 11 and extending considerably below the same, is a bar 22 carrying a plurality of laterally disposed guides 23 in which a reciprocable tamping bar 24 is mounted. Attached to the lower end of the tamping bar and vertically movable through the lowermost guide is a tamping stick 25 which is reciprocable in a rotary pipe mold 25. The tamping stick is detachably connected with the lower end of the tamping bar by means of a clamping plate 27 engaging the tamping stick and removable fastenings 28 which pass through the plates, tamping stick, and tamping bar. The clamping plate 27 also serves as a weight for the tamping bar. In this connection it is pointed out that clamping plates of different weights are employed to attain the desired results for molding pipes of different sizes.

To yieldably connect the tamping bar with the rectangular sleeve or holder, a clamp is associated with the sleeve and tamping bar. This clamp comprises a pair of clamping plates 29 extending longitudinally within the sleeve and having oppositely extending flanges 30 which overlie the ends of the sleeve. Friction strips 31 are interposed between the clamping plates and tamping bar. A longitudinally bowed leaf spring 32 is interposed between one of the clamping plates and adjacent end wall of the sleeve to urge the clamping plates laterally to cause the friction strips to frictionally engage and support the tamping bar. A bolt 33 projects laterally from one end of the sleeve and passes transversely through an opening 34 adjacent one end of a resilient lever 35, extending substantially parallel to the sleeve. At its upper end the lever is rounded to provide a fulcrum 36 which bears against the sleeve. An adjusting nut 37 is threaded upon the bolt 33 to engage the lever and adjust the same towards the sleeve. Passing transversely through the lever, intermediate its ends, is a threaded stem 38 which passes through an opening 39 in the sleeve and bears against the bowed leaf spring. Jamb nuts 40 are threaded upon the threaded stem and engage the opposite faces of the lever to secure the same to the stem. When it is desired to release the grip on the tamping bar it is only necessary to pry the resilient lever 35 away from the clamp by means of a suitable implement.

In the operation of the machine the lever 35 is first pried outwardly to release the grip on the tamping bar to permit the latter to be pulled down adjacent the bottom of the mold, as illustrated in Figure 1. After the tamping stick has reached the bottom of the mold the resilient lever is then released to cause the clamp to engage the tamping bar. The motor 20 is now started to reciprocate the tamping stick and the pipe mold rotated while the plastic material is fed into the mold. As the tamping stick strikes the plastic material it is gradually forced upwardly against the force acting on the tamping bar, while the blow imparted to the plastic material is sufficient to pack it into the mold. As the plastic material is continued to be fed into the mold, the tamping stick is automatically pushed upwardly to force the tamping bar through the clamp. Due to the force of gravity acting in conjunction with the momentum of the tamping bar on each down stroke, the bar is caused to slip slightly downwardly, while upon each upstroke of the tamping bar the friction of the clamp thereon is sufficient to grasp it. During the tamping operation the carriage is shifted forwardly slowly so that the tamping stick will continuously operate in an untamped area. It will be observed that the tamping stick is always in contact with the lowest point of the surface being tamped by reason of the tamping stick slipping downwardly upon each down stroke. Thus all tendency of soft spots in the completed pipe is eliminated. In actual practice the tamping bar is automatically pushed upwardly by the tamped material until the mold is filled, at which time the tamping stick will be disposed at the top of the mold. However, at this time the force of gravity in conjunction with the momentum of the tamping bar is tending to force the latter downwardly.

What is claimed is:—

1. In combination an elevated horizontal support, pairs of longitudinally alined brackets depending from the support, a horizontal rod supported in each pair of brackets, a carriage having pairs of longitudinally alined openings through which the rods pass to slidably support the carriage, and a tamping element reciprocable on the carriage.

2. In a tamping machine, a reciprocable sleeve, a tamping bar passing through the sleeve, coacting friction clamps in the sleeve and engaging the tamping bar, a leaf spring in the sleeve for urging the clamps into engagement with the tamping bar, a lever fulcrumed on the sleeve, a threaded element projecting from the sleeve and passing through the lever, an adjusting nut on the threaded element for adjusting the lever towards the sleeve, and a stem projecting at right angles from the lever and bearing against the spring.

3. In a tamping machine, a horizontal support, a horizontal plate slidable on the support, a vertical plate carried by one end of the horizontal plate, a vertical bar attached to one face of the vertical plate, guides carried thereby, a tamping bar reciprocable in the guides, a motor carried by the horizontal plate, a shaft journaled beneath the under face of the horizontal plate and geared directly to the motor, and an operative connection between the shaft and tamping bar.

Signed this 31st day of January, A. D., Nineteen hundred and twenty-eight.

JAMES J. HIGDON.